United States Patent
Margolin et al.

(10) Patent No.: US 10,222,795 B2
(45) Date of Patent: Mar. 5, 2019

(54) MULTI-ROTOR UAV FLIGHT CONTROL METHOD AND SYSTEM

(71) Applicants: Joshua Margolin, Herzlia (IL); Roy Ben-Anat, Herzlia (IL)

(72) Inventors: Joshua Margolin, Herzlia (IL); Roy Ben-Anat, Herzlia (IL)

(*) Notice: Subject to any disclaimer, the term of this patent is extended or adjusted under 35 U.S.C. 154(b) by 0 days.

(21) Appl. No.: 15/873,115

(22) Filed: Jan. 17, 2018

(65) Prior Publication Data
US 2018/0157253 A1 Jun. 7, 2018

Related U.S. Application Data

(63) Continuation of application No. PCT/IL2016/050814, filed on Jul. 25, 2016.

(60) Provisional application No. 62/197,569, filed on Jul. 28, 2015.

(51) Int. Cl.
| | |
|---|---|
| *H04N 5/232* | (2006.01) |
| *G05D 1/00* | (2006.01) |
| *B64C 39/02* | (2006.01) |
| *H04N 7/18* | (2006.01) |

(52) U.S. Cl.
CPC ......... *G05D 1/0038* (2013.01); *B64C 39/024* (2013.01); *H04N 5/23238* (2013.01); *H04N 7/185* (2013.01); *B64C 2201/024* (2013.01); *B64C 2201/027* (2013.01); *B64C 2201/127* (2013.01); *B64C 2201/146* (2013.01)

(58) Field of Classification Search
None
See application file for complete search history.

(56) References Cited

U.S. PATENT DOCUMENTS

| | | | | |
|---|---|---|---|---|
| 4,386,848 | A | * | 6/1983 | Clendenin ............... F41G 3/165 356/5.01 |
| 5,581,250 | A | | 12/1996 | Khvilivitzky |
| 8,325,065 | B2 | | 12/2012 | Maris |

(Continued)

FOREIGN PATENT DOCUMENTS

| | | |
|---|---|---|
| CN | 103760917 A | 4/2014 |
| WO | WO2014062275 | 4/2014 |

OTHER PUBLICATIONS

O. Jakobsen and E. Johnson, "Control Architecture for a UAV-Mounted Pan/Tilt/Roll Camera Gimbal," Infotech@Aerospace. 2005.*

(Continued)

*Primary Examiner* — Peter D Nolan
(74) *Attorney, Agent, or Firm* — Etherton Law Group, LLC

(57) ABSTRACT

Disclosed herein is a method and system for flying rotary wing drone. An add-on flight camera that is free to rotate around the vehicle's yaw axis is attached to the drone. The flight camera is automatically looking in the direction of its flight. The video from the flight camera is streamed to the operator's display. Thus the rotary wing drone can fly in any direction with respect to its structure, giving the operator a first person view along the flight path, thus keeping high level of situational awareness to the operator. The information required for controlling the camera orientation is derived from sensors, such as GPS, magnetometers, gyros and accelerometer. As a backup mode the information can be derived from propeller commands or tilt sensors.

4 Claims, 3 Drawing Sheets

(56) References Cited

U.S. PATENT DOCUMENTS

| | | | | |
|---|---|---|---|---|
| 8,903,568 | B1* | 12/2014 | Wang | G05D 1/0016 |
| | | | | 701/2 |
| 9,019,376 | B2* | 4/2015 | Lee | H04N 7/185 |
| | | | | 348/143 |
| 9,162,753 | B1* | 10/2015 | Panto | B64C 19/00 |
| 9,350,954 | B2* | 5/2016 | Wagreich | G05D 1/0038 |
| 9,533,760 | B1* | 1/2017 | Wagreich | H04N 7/185 |
| 2006/0195262 | A1* | 8/2006 | Draganov | G01S 19/43 |
| | | | | 701/472 |
| 2009/0069957 | A1* | 3/2009 | Nakamura | B64C 39/024 |
| | | | | 701/3 |
| 2010/0228406 | A1* | 9/2010 | Hamke | G05D 1/0038 |
| | | | | 701/3 |
| 2011/0301784 | A1 | 12/2011 | Oakley | |
| 2012/0089274 | A1 | 4/2012 | Lee et al. | |
| 2012/0229596 | A1 | 9/2012 | Rose | |
| 2012/0307042 | A1* | 12/2012 | Lee | G08G 5/0069 |
| | | | | 348/114 |
| 2013/0162822 | A1* | 6/2013 | Lee | H04N 7/185 |
| | | | | 348/146 |
| 2013/0176423 | A1 | 7/2013 | Rischmuller et al. | |
| 2014/0037278 | A1 | 2/2014 | Wang | |
| 2014/0327770 | A1* | 11/2014 | Wagreich | G05D 1/0038 |
| | | | | 348/148 |
| 2015/0232181 | A1* | 8/2015 | Oakley | B64C 39/024 |
| | | | | 701/2 |
| 2015/0268666 | A1* | 9/2015 | Wang | G05D 1/0016 |
| | | | | 701/2 |
| 2016/0037026 | A1* | 2/2016 | Kintner | G03B 17/561 |
| | | | | 348/36 |
| 2016/0148431 | A1* | 5/2016 | Seydoux | G06T 19/006 |
| | | | | 345/633 |
| 2016/0241767 | A1* | 8/2016 | Cho | H04N 5/23203 |
| 2016/0297545 | A1* | 10/2016 | Yang | G05D 1/0011 |
| 2016/0327950 | A1* | 11/2016 | Bachrach | G05D 1/0016 |
| 2017/0010611 | A1* | 1/2017 | Tao | G06F 3/14 |
| 2017/0075351 | A1* | 3/2017 | Liu | B64C 39/024 |
| 2017/0198747 | A1* | 7/2017 | Chen | B64C 39/024 |
| 2017/0208251 | A1* | 7/2017 | Shamir | H04N 5/23267 |
| 2017/0244937 | A1* | 8/2017 | Meier | H04N 7/188 |
| 2017/0293298 | A1* | 10/2017 | Song | G05D 1/0044 |
| 2018/0004232 | A1* | 1/2018 | Tang | G06K 9/0063 |
| 2018/0024422 | A1* | 1/2018 | Ye | F16C 11/06 |

OTHER PUBLICATIONS

International Search Report for PCT/IL2016/050814, dated Nov. 13, 2016.
International Preliminary Report on Patentability for PCT/IL2016/050814, dated Nov. 28, 2017.
Written Opinion for PCT/IL2016/050814, dated Nov. 13, 2016.
Applicant's Response to Written Opinion for PCT/IL2016/050814, dated Apr. 19, 2017.
EP Extended Search report dated Jun. 20, 2018.

* cited by examiner

MULTI-ROTOR UAV FLIGHT CONTROL METHOD AND SYSTEM

CROSS REFERENCE TO RELATED APPLICATION

This application claims the benefit of U.S. Provisional Patent Application 62/197,569 filed on 28 Jul. 2015, which is incorporated herein by reference.

TECHNICAL FIELD

The present invention generally relates to the field of remotely controlling Unmanned Aerial Vehicle (UAV), and more particularly, controlling remotely the flight of multi-rotor UAV or ducted-fan UAV.

BACKGROUND ART

Multi-rotor UAV (and multirotor copters in general) configurations have become popular in UAV (Unmanned Aerial Vehicle) as payload carrying platforms. They are known for their simplicity and for their high maneuverability. They are used for military as well as for civilian purposes. Such multi-rotor UAVs are sometimes also referred to as tri-copter, quadcopter, hexa-copter and octocopter, quads and drones. From now on we refer to these UAV's as Rotary Wing Drones.

The most difficult part of flying rotary wing drones is controlling them remotely. This difficulty arises from decrease of the situational awareness of the operator, which in turn, significantly decreases working efficiency and at the same time increases risks. Low working efficiency results in high operating costs, and risks present even higher costs associated with collision inflicted hardware damages and human injuries.

The situational awareness of the operator is dependent on two main factors: the quality of input from his senses and his attention/concentration levels. Decreasing any of the two dramatically reduces the situational awareness of the operator and hence his ability to control the rotary wing drone and to accomplish the mission's purpose.

Remote controlled rotary wing drones are mainly used to photograph and document various subjects in civilian and in military applications, such as reconnaissance missions, social events, sport events, scenery, movie scenes, maintenance of buildings, bridges, and pipelines, and also accidents, fires and home security scenes. These missions are performed by an operator/pilot which has to fly and control the rotary wing drone remotely by looking up to the sky to watch it and at the same time keep the documenting camera pointed and focused on the documented subject by watching its output on a small screen to which the film is transmitted. Attempting to simultaneously perform those two distinct operations, which are taking place in different reference systems with different rate of change, severely harm the operator's attention/concentration levels.

Moreover, remotely flying a rotary wing drone, where the operator is not onboard, intrinsically deprives the operator of sensations of speed, acceleration, noise, distance, three-dimensional image of space, directions (right/left), direction of propagation (forward/backward, to/from) and inclination (pitch/roll). Additionally, the distance between the operator and the rotary wing drone, optically converge all objects in the distance such that the operator can't distinguish the rotary wing drone from objects surrounding it. All these dramatically degrade the situational awareness of the operator and thus his ability to perform the mission efficiently and safely.

In fixed wing UAVs there is an intrinsic continuous flight path due to the aeronautical characteristics of the fixed wing UAV. This helps the operator create and maintain a better idea of the direction of movement of the UAV based on this path that is registered in his mind and thus allows him to predict the location and direction of movement to come. In contrary, because rotary wing drone can change the direction of its flight and its speed abruptly, the ability to predict the location and direction of propagation of the rotary wing drone is severely tampered, and hence also the operator's situational awareness.

Hence a solution to the problem of the degradation of situational awareness of operators of rotary wing drones is needed.

SUMMARY OF INVENTION

Technical Problem

Rotary wing drones are frequently used for documenting objects. Usually, the documenting camera is attached to the rotary wing drone pointing in the direction the its front (its roll axis). The camera is usually gimballed on the pitch and roll, and sometimes it can be rotated by the operator in the yaw axis. The main task of the ground operator is to pilot the vehicle to obtain the required documentation information. Often, the operator needs to fly the rotating wing drone in a direction which is not aligned with its roll axis. As an example, the operator is asked to film a line of olive trees in an orchard in order to evaluate the amount of fruit. In order to achieve it the operator needs to fly the rotary wing drone along the lines of the trees, where its front with the documenting camera points to the trees while it flies to its side. Thus, simultaneously the operator has to look up to the sky to watch the rotary wing drone and to keep the documenting camera pointed and focused on the documented subject by watching its output on a small screen to which the film is transmitted. Thus the situational awareness of the operator is dramatically decreased, which leads to increased risk and performance degradation.

Solution to Problem

The solution to the problem is to add a video camera, called Flight Camera, that is free to rotate around the rotary wing drone's yaw axis, and to automatically continuously point its field of view in the direction of propagation of the rotary wing drone. The video from the flight camera is streamed to the operator's display.

Advantageous Effects of Invention

The disclosed invention dramatically improves the efficiency and safety of flying rotary wing drones. It does so by returning a high level of situational awareness to the operator. As a result it increases flight safety and reduces the operational costs.

The objective of the disclosed invention is to add the ability to fly rotary wing drone from a First Person View (FPV) perspective (flying from the cockpit) regardless of the direction of the vehicle's body.

DETAILED DESCRIPTION

The invention will be described more fully hereinafter, with reference to the accompanying drawings, in which certain possible embodiments of the invention are shown. The invention may, however, be embodied in many different forms and should not be construed as limited to the embodiments set forth herein; rather these embodiments are provided so that the disclosure will be thorough and complete, and will fully convey the scope of the invention to those skilled in the art.

The description that follows refers to a multi-rotor UAV as an example, albeit, the same solution is applicable to multirotor UAVs, unmanned helicopters and to ducted-fan air vehicles. All these UAV types are referred to as Rotary Wing Drone.

Throughout the rest of the specifications and the claims we shall use the following terms as they are defined hereunder.

Natural plane is a plane that passes through the drone's center of gravity and is perpendicular to the yaw axis of the rotary wing drone.

Local coordinates are Cartesian coordinates fixed relative to the structure of the rotary wing drone. Usually they are aligned with direction of the inertial measurement unit's sensors.

The direction of the drone's flight is the direction of its propagation.

Geographic coordinates are the coordinate system in which the GPS provides information on the flight direction of the rotating wing drone.

We further define first-person-view, also known as remote-person-view, or simply video piloting, as the method used to control a remote controlled vehicle from the driver's or pilot's view point as if they were sitting on board the vehicle.

Figure 1:
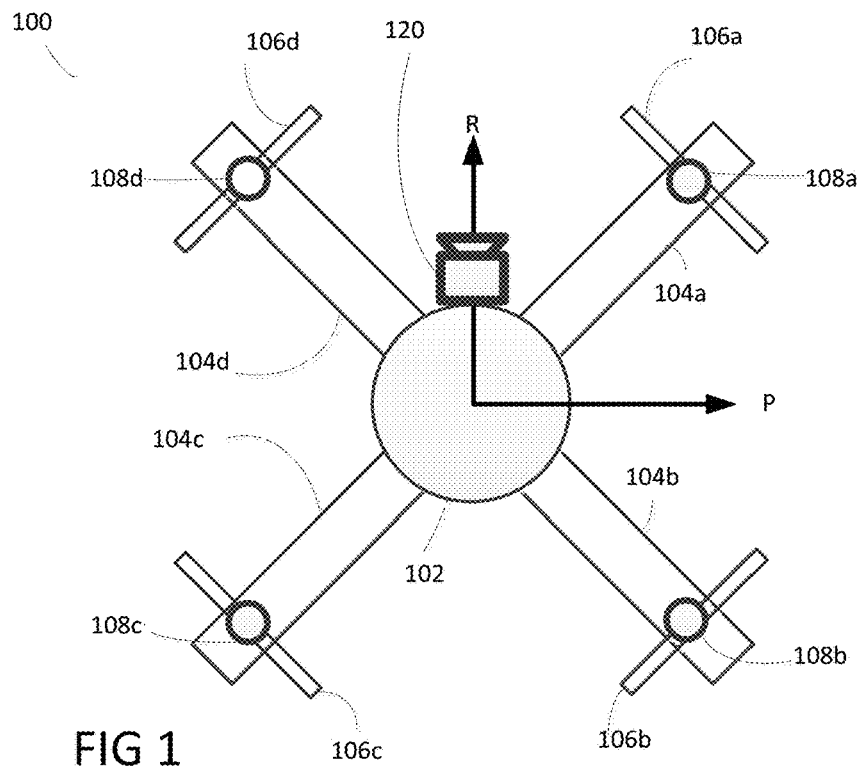
FIG. 1 shows a top view of a typical rotary wing drone.

FIG. 1 presents a top schematic view of a typical rotary wing drone 100 having four rotors. It is comprised of a body 102, to which four motor arms 104a, 104b 104c and 104d are symmetrically attached. At the end of each motor arm 104a, 104b, 104c, 104d, a propeller 106a, 106b, 106c, 106d is mounted. The rotors are driven by respective motors 108a, 108b, 108c and 108d. The propeller can be either with fixed pitch or variable pitch. The propellers of each diagonal rotate in the same direction i.e. rotors 106a and 106c rotate in one direction and rotors 106b and 106d rotate in opposite direction. The motion of the rotary wing drone is controlled by adjusting the spin speeds and optionally the pitch of its propellers. All the required electronic units are attached to the body of the rotary wing drone 102. As a minimum it contains a power unit, a motor control and drive unit and ground communication unit.

Figure 2:
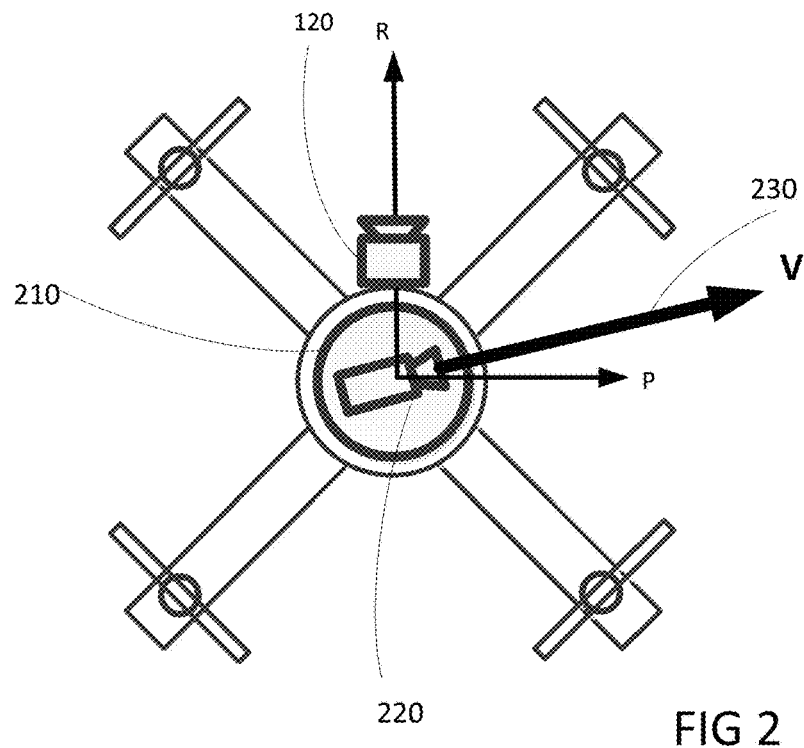
FIG. 2 shows a top view of rotary wing drone with the added flight camera.

A top view of a rotary wing drone with the added flight camera unit, according to the invention is shown in FIG. 2. A video camera unit 210 is mounted on the body is comprised of a video camera 220 attached to a gimbal that is free to rotate around the yaw axis of the rotary wing drone. The yaw axis in the figure is perpendicular to the plane of the paper. The plane of the paper also represents the natural plane. The camera is controlled to look in the direction of the projection of the flight direction on the natural plane V—230. The camera unit contains the required electronics that supports its operation. Note, that during calibration, the representation of the yaw axis in the local coordinate system has to be determined, as well as the zero reference direction of the video camera.

Figure 3:
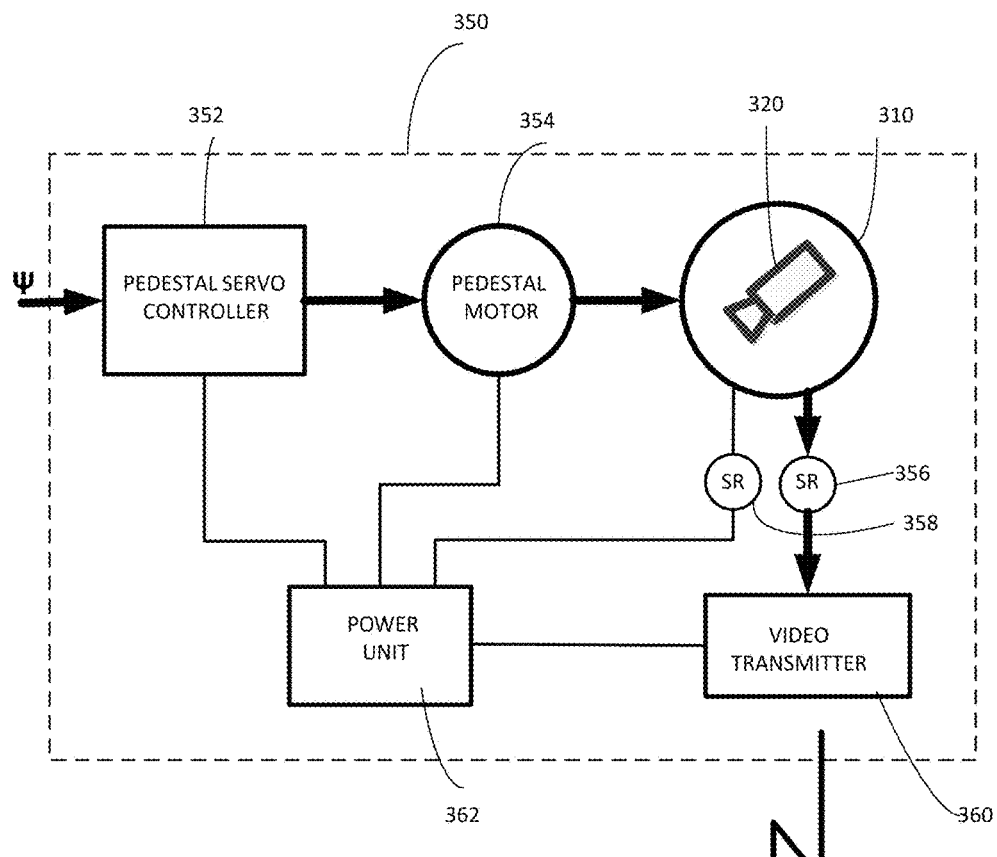
FIG. 3 shows a block diagram of one embodiment of the flight camera.
Figure 3:
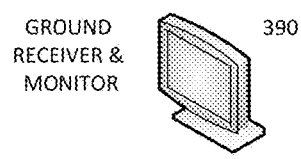

A detailed block diagram of the flight camera unit 350 is presented in FIG. 3. The flight-camera-unit 350 is comprised of a flight camera 320 firmly attached to 360° CW/CCW rotating camera pedestal 310. The camera pedestal is driven by a pedestal motor 354 which is controlled by pedestal servo controller 352. The pedestal servo controller accepts as a command the angle $\Psi$ of the required center of the field of view of the camera. The flight camera unit includes a video transmitter 360, that transmits the video to a ground receiver and monitor 390. The signals to and from the camera are channeled via slip rings 356 and 358, one for the video signal and one for the power. All components get the energy from a power unit 362.

Figure 4:
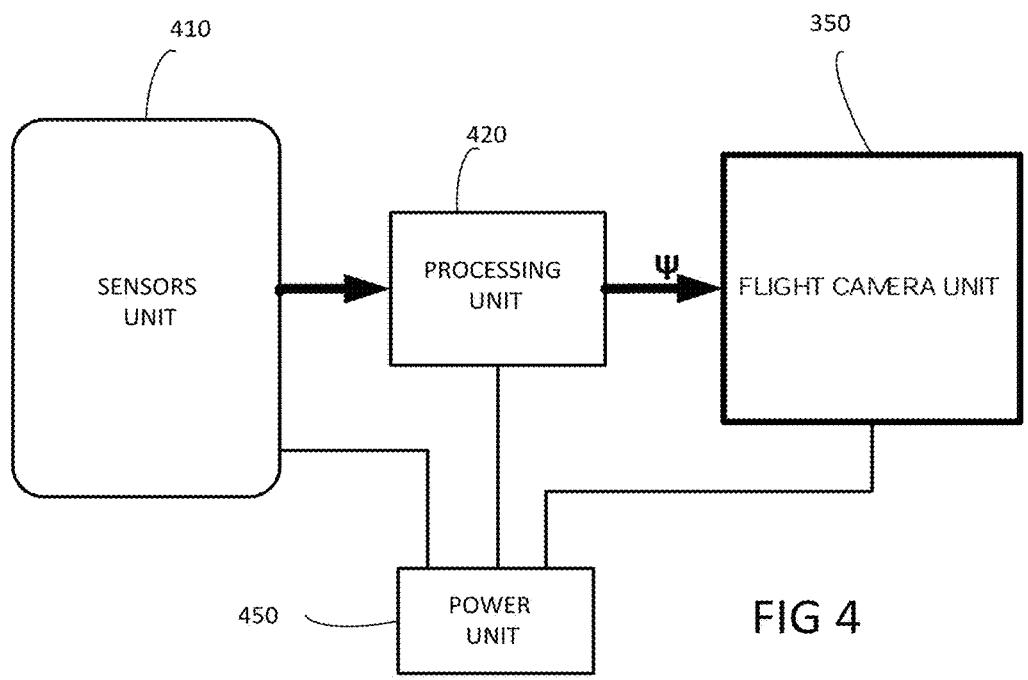
FIG. 4 shows a block diagram of one embodiment of the flight camera alignment.

Block diagram of one embodiment of the invention is presented in FIG. 4. The flight-camera-system is comprised of a sensors unit 410, processing unit 420 and the flight camera unit 350. The sensors unit provides its data to a processing unit 420. The processor unit 420 computes the angle $\Psi$ to which the flight camera has to be rotated in order to point in the direction of vehicle's direction of flight in the natural plane, and it provides driving signals to the flight camera unit 350 which rotates the camera to the desired direction. All components get their power from a power unit 450. The power unit can be independent or it can get its energy from the power source of the vehicle. Note that the sensors used by the system can be either add on sensors, or the rotary wing drone built in sensors.

The sensors unit 410 is comprised, as a minimum, of a GPS and magnetometers, and can include additional sensors such as accelerometers and gyros. The sensors provide the data required for the computation of the direction of the flight in local coordinates. The use of the additional sensors, results in improved accuracy in the positioning of the flight camera. It is important to note that the field of view of the flight camera is much wider than the magnetic deviation, so the error induced by the use of magnetometers and not the geographical north is meaningless. If accurate INS system is used, there is no need for the magnetometers.

Figure 5:
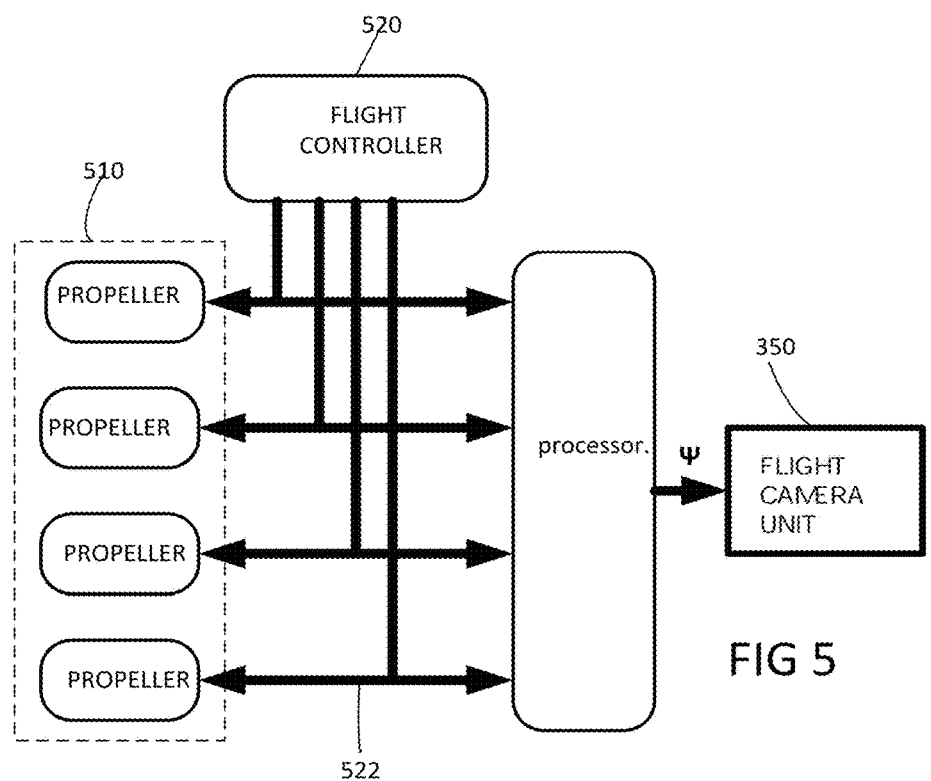
FIG. 5 presents another implementation of the disclosed invention.

FIG. 5 presents another implementation of the disclosed invention. This implementation can be used as a backup mode when GPS signals are blocked, such as in a building, or when the drone's flight is not affected by winds. In this implementation the direction of flight of the rotary wing drone is computed by the processor from the commands 522 sent to the propellers 510 by the flight controller 520.

In a similar way, the flight direction of the rotary wing drone, can be evaluated by tilt sensors attached to it. This method is also used as backup mode or when GPS signal is unavailable.

What has been described above are just a few possible embodiments of the disclosed invention. It is of course, not possible to describe every conceivable combination of components and/or methodologies, but one of ordinary skill in the art may recognize that many further combinations and permutations are possible. Accordingly, the invention is intended to embrace all such alterations, modifications, and variations that fall within the spirit and scope of the invention.

The invention claimed is:

1. A method for remotely piloting a rotary wing drone flying in any direction, by streaming to the drone's operator a first-person-view video in the direction of the drone's flight, regardless of the drone's yaw, the method comprising:
   a. fitting the drone with a video camera capable of rotating around the drone's yaw axis;
   b. acquiring the projection of the drone's flight direction on the natural plane in local coordinates;
   c. automatically turning the video camera so that the center of its field of view is aligned with the projection of the drone's flight direction on the natural plane; and
   d. continuously streaming the video from the video camera to an operator's client, where the projection of the drone's flight direction on the natural plane is computed from commands applied to the drone's rotors.

2. A method for piloting remotely a rotary wing drone in any direction relative to its local coordinates, by streaming first-person-view video to the drone's ground operator, where the center of field of view is pointing in the direction of the drone's flight, regardless of the drone's yaw, the method comprising:
   a. fitting the drone with a plurality of fixed video cameras that provide 360 degree video coverage around the drone's yaw axis;
   b. acquiring the projection of the drone's flight direction on the natural plane;
   c. using the fixed cameras' 360 degrees video, encode a limited field-of-view video, with the center of its field of view aligned with the projection of drone's flight direction on the natural plane; and
   d. continuously streaming the video from the encoded limited field-of-view video camera to an operator's client,
   where the projection of the drone's flight direction on the natural plane is computed from commands applied to the drone's rotors.

3. A method for remotely piloting a rotary wing drone equipped with a documenting video camera, flying in any direction, by streaming to the drone's operator a first-person-view video in the direction of the drone's flight, regardless of the drone's yaw, the method comprising:
   a. fitting the drone with a flight video camera capable of rotating around the drone's yaw axis;
   b. acquiring the projection of the drone's flight direction on the natural plane in local coordinates;
   c. automatically turning the flight video camera so that the center of its field of view is aligned with the projection of the drone's flight direction on the natural plane; and
   d. continuously streaming the video from the flight video camera to an operator's client, such that the documenting video camera may document a subject outside the flight video camera's field of view while the flight video camera is aligned with the projection of the drone's flight direction on the natural plane, where the projection of the drone's flight direction on the natural plane is computed from commands applied to the drone's rotors.

4. A method for piloting remotely a rotary wing drone equipped with a documentary camera in any direction relative to its local coordinates, by streaming first-person-view video to the drone's ground operator, where the center of field of view is pointing in the direction of the drone's flight, regardless of the drone's yaw, the method comprising:
   a. fitting the drone with a plurality of fixed flight video cameras that provide 360 degree video coverage around the drone's yaw axis;
   b. acquiring the projection of the drone's flight direction on the natural plane;
   c. using the fixed flight cameras' 360 degrees video, encoding a limited field-of-view video, with the center of its field of view aligned with the projection of the drone's flight direction on the natural plane, and
   d. continuously streaming the encoded limited field-of-view video to an operator's client,
   such that the documenting video camera may document a subject outside the flight video camera's field of view while the flight video camera encoded field of view is aligned with the projection of the drone's flight direction on the natural plane,
   where the projection of the drone's flight direction on the natural plane is computed from commands applied to the drone's rotors.

* * * * *